June 3, 1958
F. FAHLAND
2,837,038
HIGHWAY TRAILER CARRYING CAR
Filed Oct. 18, 1954
4 Sheets-Sheet 1
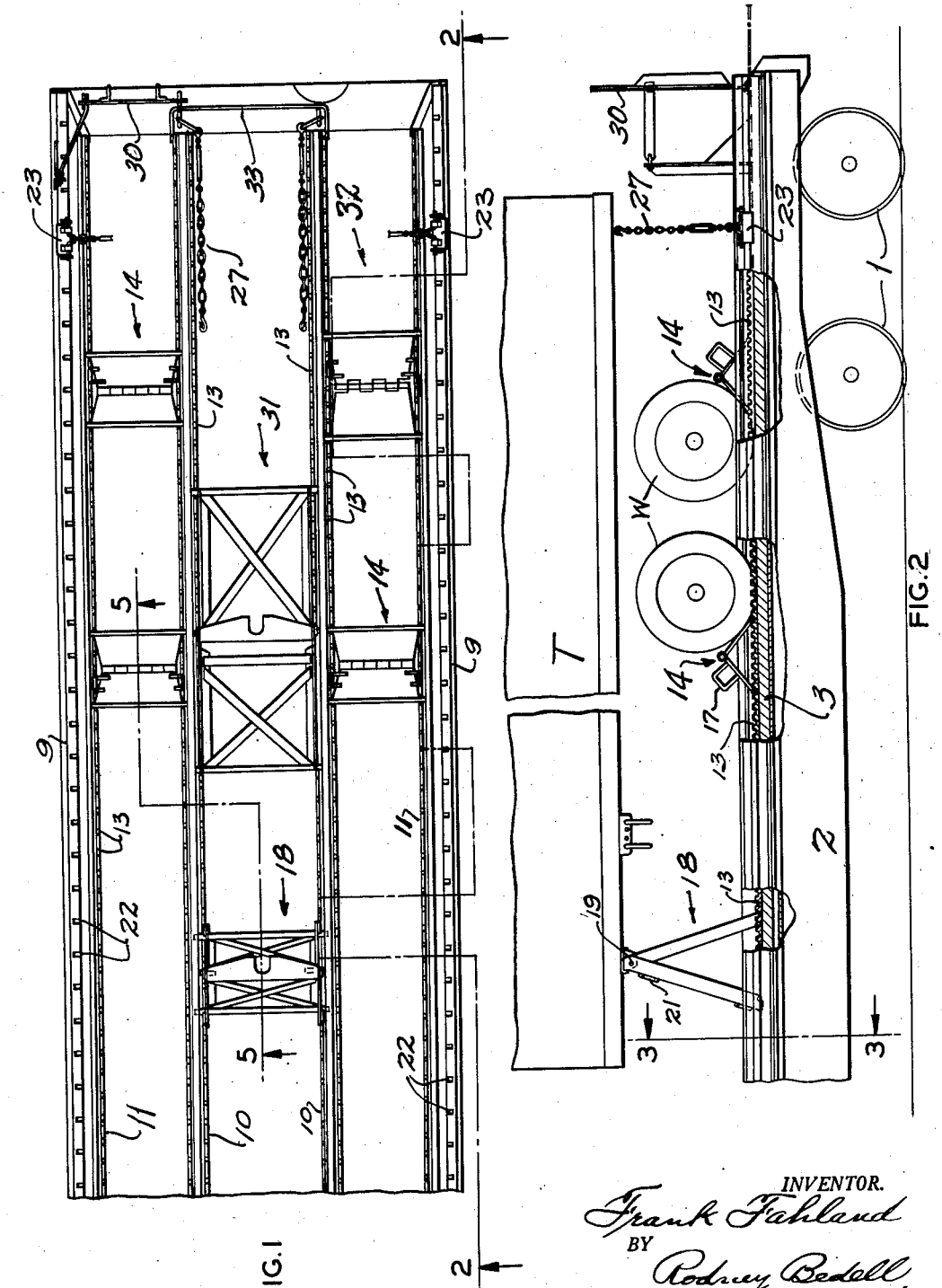
INVENTOR.
Frank Fahland
BY Rodney Bedell
atty.

June 3, 1958  F. FAHLAND  2,837,038
HIGHWAY TRAILER CARRYING CAR

Filed Oct. 18, 1954  4 Sheets-Sheet 2

INVENTOR.
Frank Fahland
BY Rodney Bedell
atty.

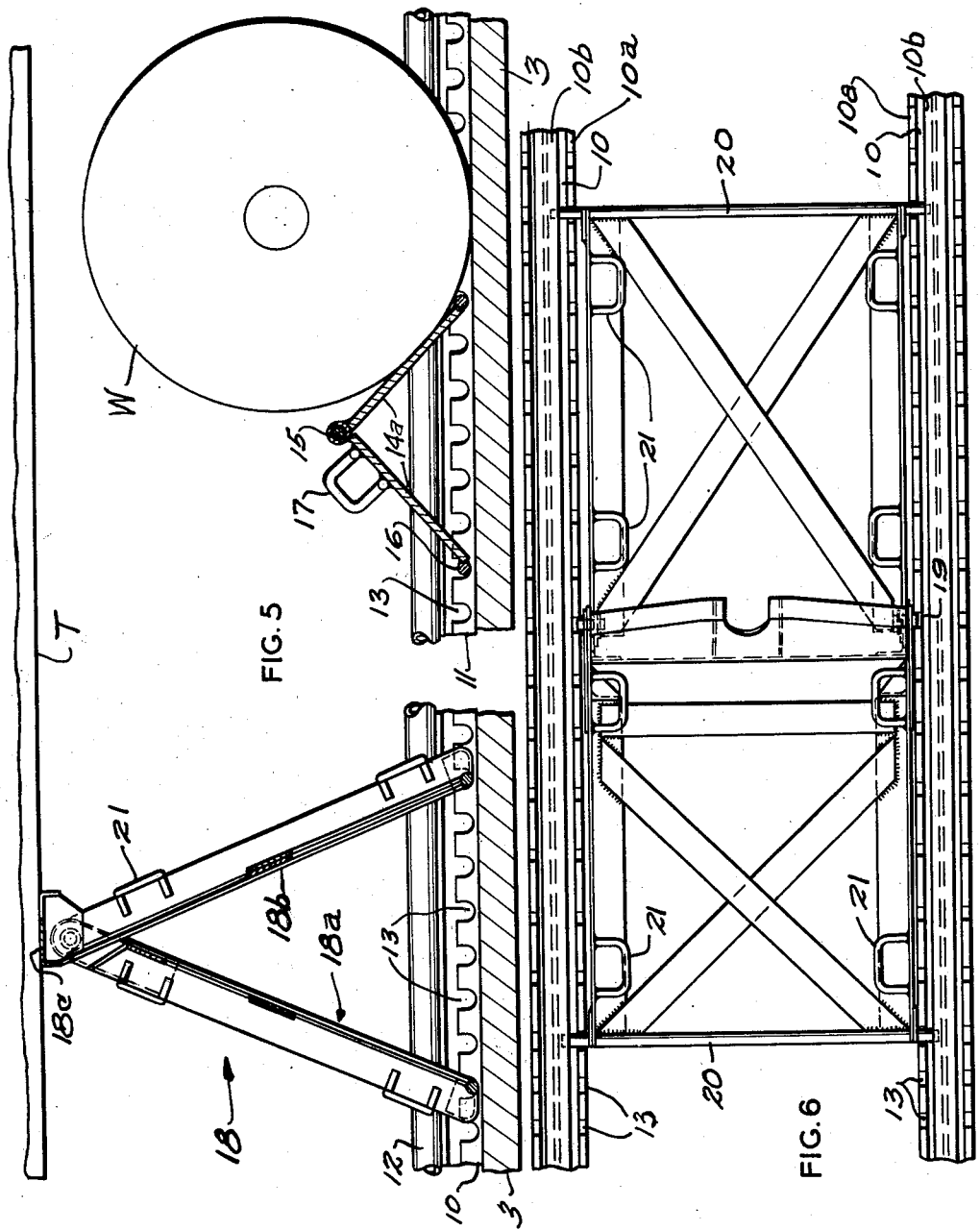

United States Patent Office 2,837,038
Patented June 3, 1958

2,837,038

HIGHWAY TRAILER CARRYING CAR

Frank Fahland, Omaha, Nebr.

Application October 18, 1954, Serial No. 462,808

8 Claims. (Cl. 105—368)

The invention relates to railway rolling stock and more particularly to a car of the flat car type with equipment adapting it for the carrying of wheeled vehicles, such as highway tractor trailers in so-called "piggy-back" or "TOFC" (trailer on flat car) service.

The main object of the invention is to provide a car with devices which, when not in use, will lie substantially flat upon the car floor, particularly when a highway tractor trailer is run onto the car from one end or off one end, and the car may be used for transporting lading in the usual manner, or the devices may be raised and positioned along the car to support a highway trailer body and to block the trailer wheels.

The car floor may include bars or rails extending substantially from end to end of the floor with which the support and block devices are associated when in use for positioning them as desired and will provide lading supporting elements when the devices are not being used.

Another object is to facilitate the application of holddown devices to the trailer irrespective of the length of the trailer or of its position lengthwise of the car.

Another object is to prevent inadvertent removal of the securing devices from the car while permitting positioning of the securing devices longitudinally of the car as desired.

These objects and other detailed objects as will be apparent from the following description are attained by the structure illustrated in the accompanying drawings, in which:

Figure 1 is a top view of one longitudinal half of a car embodying the invention.

Figure 2 is a side elevation of the structure shown in Figure 1 with a highway transport trailer mounted on the car, portions of the structure being sectioned on the line 2—2 of Figure 1 to better illustrate some of the features.

Figure 5 is a longitudinal section taken on the line 5—5 of Figure 1 and showing the adjacent portions of the collapsible devices for holding and supporting a trailer.

Figure 6 is a top view of the trailer supporting pedestal when collapsed flat on the car floor.

Figure 3:
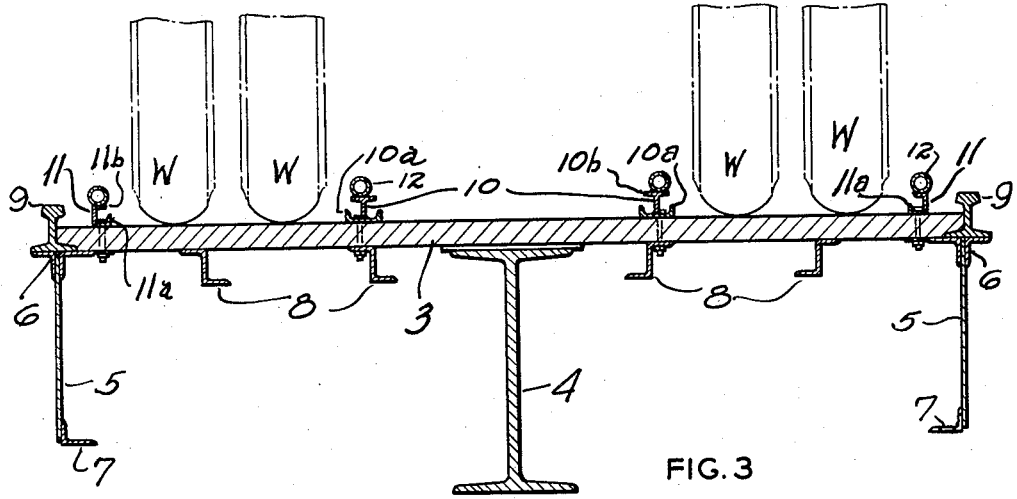
Figure 3 is a transverse vertical section taken on the line 3—3 of Figure 2.
Figure 4:
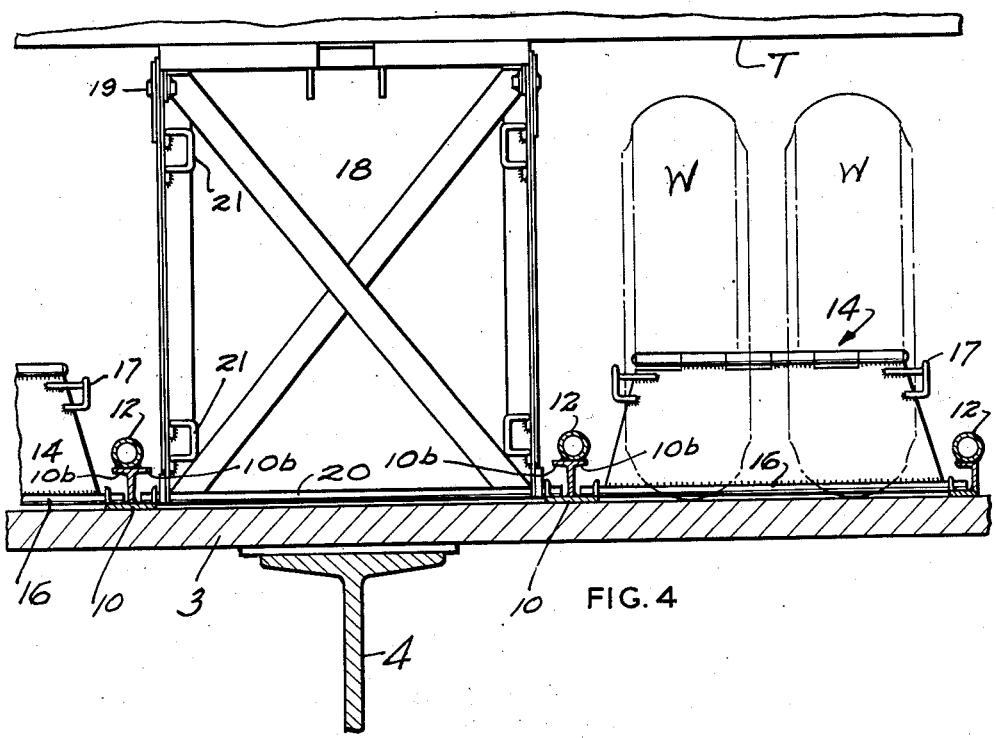
Figure 4 is a detail transverse vertical section corresponding to the central portion of Figure 3 but drawn to a larger scale and showing the trailer wheel chock and the trailer supporting pedestal.

The car resembles generally a railway flat car with a truck at each end, as indicated by the wheels 1, and with an underframe 2 mounted on the trucks in the usual manner and provided with a floor 3. The underframe includes a central main member 4 of I-beam section, plate side girders 5 with reinforcing angles 6 and 7, and longitudinal stringers 8 of Z bar section.

A rail 9 is carried by each girder 5 along the edge of floor 3. Extending lengthwise of the floor and substantially from end to end thereof are a plurality of metal bars 10 and 11, having upstanding flanges 10a and 11a, respectively. One of the bars 11 is adjacent to each side rail 9 and the other two bars 10 are spaced inwardly from bars 11 far enough to receive between each bar 10 and 11 the wheels W of a highway trailer. Preferably each bar 10 and 11 mounts a tube 12, the side of the tube being flush with the inner edge of the top horizontal flange 10b and 11b of the bar and forming a guard and guide for engaging the sides of wheels W. Upstanding flanges 10a and 11a are notched or recessed at intervals as indicated at 13 substantially throughout their length.

Figure 7:
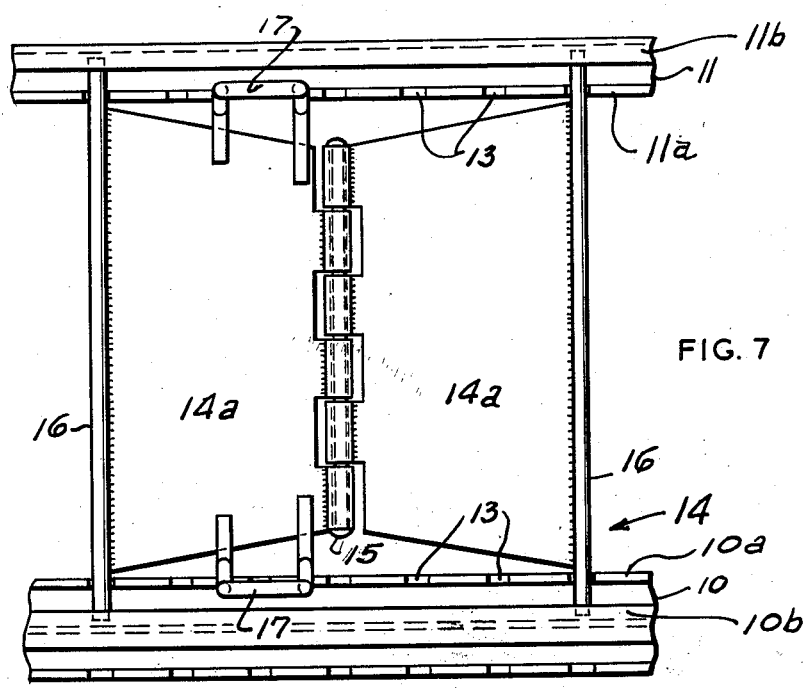
Figure 7 is a top view of the trailer wheel chock when laid flat on the car floor.
Figure 8:
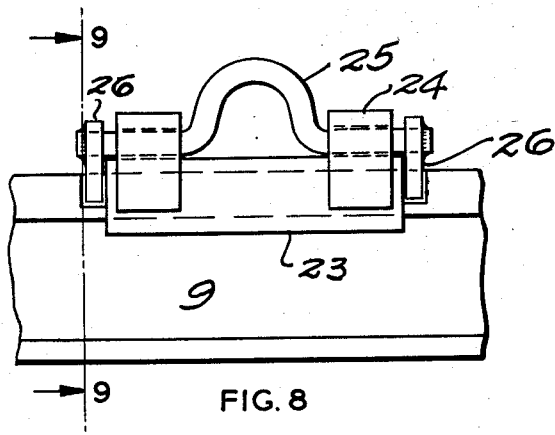
Figure 8 is a side view of a section of a rail at the side of the car and a movable chain anchor mounted thereon.
Figure 9:
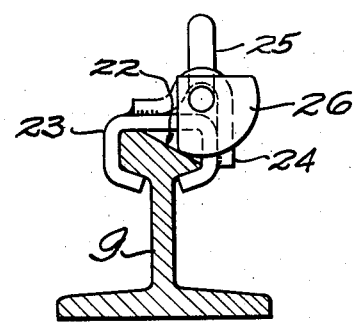
Figure 9 is a transverse section taken on the line 9—9 of Figure 8.

The car is provided with a plurality of wheel blocks 14, detailed in Figures 5 and 7, each comprising a pair of plates 14a hinged together by a pin 15 and provided with rods 16 at their remote edges. Rods 16 extend parallel to hinge pins 15 and beyond the side edges of plates 14a and are receivable in recesses 13. Rods 16 are longer than the transverse distance between the opposing edges of adjacent flanges 10b and 11b and blocks 14 cannot be inadvertently lifted from the car and discarded. One plate 14a of each wheel block has a pair of handles 17 to facilitate handling of the block.

The wheel blocks are readily shiftable to selected recesses 13 after a trailer T has been loaded on the car to engage the trailer wheels W and hold the trailer against rolling lengthwise of the car.

The car is provided with one or more pedestals 18, each comprising a pair of hinged open frames 18a and 18b, detailed in Figures 5 and 6. The two frames are hinged together by pins 19 and provided with rods 20 at their remote edges, which extend beyond the sides of the frames and are receivable in selected recesses 13. Rods 20 are longer than the transverse distance between opposing edges of adjacent flanges 10b of bars 10, so that pedestals 18 cannot be lifted from the car and inadvertently discarded. Each frame is provided with handles 21 to facilitate the manual handling of the frames. Frame 18b is provided with a top plate 18c which has a surface arranged for engagement with the underside of trailer T when the pedestal is in the trailer supporting position.

The pedestals are readily shifted to different points lengthwise of the car and top plate 18c is used to support the forward end of the trailer after the latter is positioned upon the car.

Wheel blocks 14 will generally be placed between a bar 11 and an adjacent bar 10. Pedestals 18 will generally be spaced between the pair of bars 10 and under the center of the trailer body.

The head of each side rail 9 is notched at intervals as indicated at 22 and a plurality of anchors 23 are slidable lengthwise of the side rails. Each anchor body has a channel-like cross section embracing the rail head and is provided with a pair of spaced hinged butts 24 for journaling the ends of a link 25. Because of the embracing relation of the anchor to the rail head, the anchor can be removed only by sliding it to the end of the rail, thus preventing inadvertent removal of the anchor from the car. On the ends of link 25 are latches 26 adapted to be received in rail head notches 22 to engage the opposing shoulders formed by the ends of the notches and thus hold the anchor against movement lengthwise of the car. Chains 27 are each secured to links 25 or to an end portion of the car floor for anchoring the trailer body against undue action of its springs as is customary with trailer-on-flat-car loading.

At each end of the car is a plate 30 hinged at its lower end to the car floor and movable from the upright position shown in Figure 2 to a lowered position, in which it extends lengthwise from the car with its swinging end resting upon the end floor portion of an adjacent car, thus forming a runway for trailers which may be run circus fashion over successive cars.

With the above arrangement, one or more trailers, depending upon their length, may be loaded upon a car equipped as described and securely held in position lengthwise of the car so that the cars may travel at relatively high speeds without likelihood of movement of the trailers along the car or transversely of the car. The trailer securing devices are readily positioned at desired points and are readily adjusted for height and wheel blocking angle and are readily swung on their respective hinges to flat position, as indicated at 31 and 32 in Figure 1, to lie between bars 10 and 11 and below the level of the tops of these bars so that trailers can be run onto the car from one end or off one end and so that the car may serve in the usual manner for lading other than trailers.

Anchors 23 and their associated chains may be used for securing lumber, crates, or almost any type of lading in place or they may be slid off of the end of side rails 9 and disposed between the longitudinal bars 10, 11 as are the wheel blocks and pedestals. Preferably, two or more barriers 33 will extend between longitudinal bars 10 to retain anchors 23 and chains 27 from sliding off the end of the car when they are not in use and are temporarily stored between rails 10.

The described structure facilitates the adapting of flat cars or the like for "piggy-back" service and particularly for high speed service and adequately attains the objects set forth in this specification.

The details of the structure may be varied substantially without departing from the spirit of the invention and the exclusive use of those modifications coming within the scope of the claims is contemplated.

What is claimed is:

1. In combination, a railway car having a floor and a plurality of parallel bars spaced apart and extending lengthwise of the floor and provided with a series of upwardly opening recesses at intervals, and a device between said bars and comprising two members having a hinged connection at one end of the device and provided with transversely extending elements at the ends of the members spaced from the hinged connection and arranged for seating in relatively closely spaced recesses in said bars to hold the hinged portion of the device in elevated position, to form a vehicle positioning device, or in relatively remotely spaced recesses to lower the hinged connection to accommodate movement of a vehicle wheel along the floor.

2. In combination, a railway car having a floor and a plurality of parallel bars spaced apart and extending lengthwise of the floor and provided with a series of upwardly opening recesses at intervals, and a device between said bars and comprising two members having a hinged connection at one end of the device and provided with transversely extending elements at the ends of the members spaced from the hinged connection and projecting transversely of the car beyond the members and arranged for selective seating in relatively closely spaced recesses in said bars to hold the hinged portion of the device in elevated position, to form a vehicle body support, or in relatively remotely spaced recesses to lower the hinged connection to accommodate movement of a vehicle along the floor.

3. In combination, a railway car having a floor and a pair of parallel bars spaced apart and extending lengthwise of the central portion of the floor, and similar bars extending lengthwise of the floor adjacent to the sides of the car, all of said bars being provided with a series of upwardly opening recesses at intervals along their length, a device positioned between the first two-mentioned bars and comprising two members having a hinged connection at one end of the device and provided with transversely extending elements at the ends of the members spaced from the hinged connection and arranged for seating in relatively closely spaced recesses in said bars to hold the hinged portion of the device in elevated position, to form a vehicle body support, or in relatively remotely spaced recesses to lower the hinged connection to accommodate movement of a vehicle along the floor over the members, and a device between each bar at the side of the car and the adjacent bar comprising two members having a hinged connection at one end of the device and provided with transversely extending elements at the end of the member spaced from the hinged connection and arranged for seating in relatively closely spaced recesses in the associated bars to hold the hinge portion of the device in elevated position, to form a vehicle wheel stop, or in relatively remotely spaced recesses to lower the hinged connection and accommodate movement of a vehicle along the floor and over the members.

4. A railway car having a floor and a plurality of bars extending lengthwise of the car with upwardly facing recesses at intervals, the spaces between the bars affording a substantial uninterrupted path for the movement of the wheels of a highway trailer mounted on the car, and devices between the bars and collapsible to line on the floor beneath the level of the tops of said bars to accommodate lading placed on said bars and the movement of a trailer lengthwise of the car, said devices being movable to raised positions and including elements insertible in selected one of said recesses to hold the devices in raised position to support a trailer body and to hold its wheels against movement along the car.

5. A railway car having a floor provided with an elongated rail extending along the side of the car and having an upright web and a head provided with a series of transverse notches at intervals, there being a shoe slidable along the rail and having rigid elements slidably engaging the underside of the rail head and having a latch pivoted to swing transversely of the rail into and out of engagement with selected notches to hold the shoe against movement along the rail, the shoe being provided with an eye for receiving a vehicle anchoring chain or the like.

6. A railway car having a floor provided with upstanding bars elongated lengthwise of the car with upwardly opening recesses at intervals for receiving vehicle positioning devices, there being elongated flexible chain-like members secured to the car for anchoring a highway trailer vehicle thereto, and upright members extending transversely of the car and forming with said bars barriers preventing undue movement of said chain-like members over the car floor when the chain-like members are lying on the car floor.

7. In a railway car having a floor provided with a plurality of upstanding bars running lengthwise of the car and spaced apart transversely of the car and having upwardly opening recesses at intervals, vehicle positioning devices including parts extending therefrom transversely of the car with their ends receivable in selected ones of said recesses, an element associated with each of said bars and projecting horizontally above the level of the ends of said vehicle positioning device parts, the transverse distance between said elements on adjacent bars being less than the distance over the outer ends of said parts whereby removal upwardly of said positioning devices from the car is prevented.

8. A railway car having a floor provided with an elongated rail extending along the side of the car and having an upstanding web and a wider head having notches at intervals throughout its length, each notch forming opposing shoulders facing each other lengthwise of the rail, and an anchoring device including a body slidable on the rail lengthwise of the car and providing with relatively fixed parts engaging the underside of the rail head, and provided with an element movable toward and from the rail into and out of a selected notch to oppose the corresponding shoulders to hold the device against movement along the rail.

References Cited in the file of this patent

UNITED STATES PATENTS

| | | |
|---|---|---|
| 1,990,562 | Otis | Feb. 12, 1935 |
| 2,001,935 | Otis | May 21, 1935 |
| 2,036,344 | Menhall | Apr. 7, 1936 |
| 2,052,914 | Williams | Sept. 1, 1936 |
| 2,099,288 | Allen | Nov. 16, 1937 |
| 2,159,479 | Goodwin et al. | May 23, 1939 |
| 2,525,388 | Willetts | Oct. 10, 1950 |
| 2,652,003 | Porte | Sept. 15, 1953 |